United States Patent
Umemoto et al.

(10) Patent No.: US 10,615,659 B2
(45) Date of Patent: Apr. 7, 2020

(54) ROTARY ELECTRIC MACHINE

(71) Applicant: Mitsubishi Electric Corporation, Chiyoda-ku (JP)

(72) Inventors: Takahiro Umemoto, Chiyoda-ku (JP); Yasutomo Otake, Chiyoda-ku (JP); Manabu Yoshimura, Chiyoda-ku (JP); Takashi Nada, Chiyoda-ku (JP); Makoto Tsukiji, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 26 days.

(21) Appl. No.: 16/087,767

(22) PCT Filed: Nov. 24, 2016

(86) PCT No.: PCT/JP2016/084803
§ 371 (c)(1),
(2) Date: Sep. 24, 2018

(87) PCT Pub. No.: WO2017/183223
PCT Pub. Date: Oct. 26, 2017

(65) Prior Publication Data
US 2019/0109507 A1 Apr. 11, 2019

(30) Foreign Application Priority Data
Apr. 22, 2016 (JP) ................. 2016-086101

(51) Int. Cl.
*H02K 3/40* (2006.01)
*H02K 3/30* (2006.01)
*H02K 3/32* (2006.01)

(52) U.S. Cl.
CPC ............. *H02K 3/40* (2013.01); *H02K 3/30* (2013.01); *H02K 3/32* (2013.01); *H02K 2213/03* (2013.01)

(58) Field of Classification Search
CPC .. H02K 3/30; H02K 3/32; H02K 3/40; H02K 2213/03
See application file for complete search history.

(56) References Cited

U.S. PATENT DOCUMENTS 1,784,990 A * 12/1930 Hill ..................... H02K 3/40
310/196

FOREIGN PATENT DOCUMENTS

JP 49-9321 A 1/1974
JP 61-22733 A 1/1986
(Continued)

OTHER PUBLICATIONS

International Search Report dated Feb. 14, 2017 in PCT/JP2016/084803 filed Nov. 24, 2016.

*Primary Examiner* — Mohamad A Musleh
(74) *Attorney, Agent, or Firm* — Oblon, McClelland, Maier & Neustadt, L.L.P.

(57) ABSTRACT

A stator coil accommodated in a slot of a rotary electric machine includes a coil conductor, a main insulating layer, a low resistance corona shield layer, and a stator coil extending outside the slot is provided with a first stator coil at the end of the low resistance corona shield layer has a first nonlinear resistance layer and a second nonlinear resistance layer partially overlapping with an end of the first nonlinear resistance layer, and a lower limit value of an electric resistivity of the second nonlinear resistance layer in a predetermined electric field is larger than an upper limit value of an electric resistivity of the first nonlinear resistance layer by one order of magnitude or more.

11 Claims, 12 Drawing Sheets

(56) References Cited

FOREIGN PATENT DOCUMENTS

| | | | |
|---|---|---|---|
| JP | 61-34836 B2 | | 8/1986 |
| JP | 2863649 B2 | | 3/1999 |
| JP | 2005080468 A | * | 3/2005 |
| JP | 2008125149 A | * | 5/2008 |
| JP | 2009118590 A | * | 5/2009 |
| JP | 2011193727 A | * | 9/2011 |
| JP | 2011223874 A | * | 11/2011 |

* cited by examiner

ROTARY ELECTRIC MACHINE

TECHNICAL FIELD

The present invention relates to a rotary electric machine, more particularly to a large rotary electric machine typified by a turbine generator.

BACKGROUND ART

A large rotary electric machine typified by a turbine generator needs to have high insulation performance that passes a withstand voltage test performed before shipment and does not cause defects such as an insulation abnormality for an operation period of several tens of years. Particularly in a stator coil to which a high voltage is applied, the structure described below is generally adopted to suppress partial discharge and insulation abnormalities caused by partial discharge during a withstand voltage test or normal operation.

In the basic structure of a stator coil, a main insulation layer is formed around a coil conductor. This coil conductor includes, for example, a bundle of copper elemental wires. In addition, the main insulation layer is formed by winding mica tapes having very good corona-resistant discharge characteristics around the coil conductor, impregnating the mica tapes with heat-hardening resin such as epoxy resin, and curing the heat-hardening resin.

A part of the stator coil is accommodated in a slot of a stator iron core and an end part thereof extends outside the slot. The part of the stator coil accommodated in the slot of the stator iron core and the part partially extending outside the slot from this part are provided with a low resistance corona shield layer having semi-conductivity on the outer peripheral part of the main insulation layer. This low resistance corona shield layer makes close contact with the stator iron core having a ground electric potential and has the function of suppressing discharge within the slot by setting the electric potential on the outermost layer of the stator coil to the ground electric potential.

On the other hand, the part of the stator coil extending outside the slot is generally referred to as a coil end. The surface potential of the coil end sharply rises from the end part of the low resistance corona shield layer covering the part partially extending outside the slot toward the outside in the longitudinal direction of the coil. This sharp difference of the surface potential may cause creepage discharge at the coil end.

A nonlinear resistance layer partially overlapping with the end part of the low resistance corona shield layer is provided to suppress such a sharp rise in the surface potential at the coil end. In the nonlinear resistance material constituting this nonlinear resistance layer, the electric resistivity reduces nonlinearly as the electric field strength applied to the material increases. In the nonlinear resistance layer provided on the surface of the coil end, when the surface potential difference (electric field strength) of the stator coil increases to a certain level or more, the electric resistivity of the nonlinear resistance layer reduces. As a result, current flows to the low resistance corona shield layer having the ground electric potential in the nonlinear resistance layer and suppresses a sharp rise in the surface potential of coil end, thereby enabling suppression of creepage discharge. This function of suppressing occurrence of creepage discharge of the nonlinear resistance layer is referred to as the electric field relaxation function.

The nonlinear resistance material used for a large rotary machine generally includes silicon carbide (SiC) particles mixed with insulating resin. The nonlinear resistance layer is formed by, for example, shaping such a material in a semi-hard state like tapes, winding the material around the surface of the main insulation layer, which is a basic structure of the stator coil, and thermally curing the material or by applying such a material in a paint-like state onto the surface of the main insulation layer and drying the material. The electric resistivity varies greatly in the nonlinear resistance layer formed in this way, thereby increasing production variations in the electric field relaxation function. In order to improve the electric field relaxation function, the nonlinear resistance layer having a large electric resistivity and the nonlinear resistance layer having a small electric resistivity have been used together.

For example, a plurality of nonlinear resistance layers is laminated with each other sequentially toward the outside of the coil end so that the outside nonlinear resistance layer (upper layer) has an electric resistivity and formation length larger than the nonlinear resistance layer (lower layer) close to the slot (see PTL 1, for example). In another method, a plurality of nonlinear resistance layers having different electric resistivities are laminated with each other so that the nonlinear resistance layer with a smaller electric resistivity has a smaller formation length (see PTL 2, for example).

CITATION LIST

Patent Literature

PTL 1: JP-UM-B-61-34836 (FIG. 2 on page 2)
PTL 2: Japanese Patent No. 2863649 (FIG. 1 on page 2)

SUMMARY OF INVENTION

Technical Problem

In a withstand voltage test of a large high voltage rotary machine such as a turbine generator performed before shipment of the product, the voltage obtained by doubling the rated voltage and adding 1 kV to the result is applied as the test voltage to the conductor of a stator coil. In this withstand voltage test, the current flowing through the nonlinear resistance layer is much larger than the case in which the rated voltage is applied. This current and the resistance component of the nonlinear resistance material generate Joule heat, thereby locally raising the temperature of the nonlinear resistance layer. The nonlinear resistance material described above has a higher resistance as the temperature rises and the change in the electric resistivity is irreversible. That is, when the resistance of the nonlinear resistance material has become large once as the temperature rises, the high resistance state is kept after cooling. When a plurality of withstand voltage tests is performed, the nonlinear resistance layer is likely to have a higher resistance.

In the conventional method that uses a nonlinear resistance layer having a large electric resistivity and a nonlinear resistance layer having a small electric resistivity together, when a plurality of withstand voltage tests is performed, the electric resistivity of the nonlinear resistance layer having a small electric resistivity increases, the difference with the electric resistivity of the nonlinear resistance layer having a large electric resistivity reduces. As a result, the inventor et al. have newly found that just use of the nonlinear resistance layer having a large electric resistivity together with the nonlinear resistance layer having a small electric resistivity degrades the electric field relaxation function because the difference between these resistivities reduces after withstand voltage tests.

The invention addresses the above problems with an object of obtaining a stable electric field relaxation function that improves production variations in the electric field relaxation function caused by variations in the electric resistivities of the nonlinear resistance layers even when the electric resistivities of the nonlinear resistance layers increase in withstand voltage tests in a rotary electric machine using the nonlinear resistance layer having a large electric resistivity and the nonlinear resistance layer having a small electric resistivity together.

Solution to Problem

A rotary electric machine according to the invention includes a stator iron core having a slot; a rotor rotatable with respect to the stator iron core; and a stator coil having a part accommodated in the slot and an end part extending outside the slot, in which the stator coil includes a coil conductor and a main insulation layer provided on an outer peripheral part of the coil conductor, the part of the stator coil accommodated in the slot has a low resistance corona shield layer provided on an outer peripheral part of the main insulation layer, the part of the stator coil extending outside the slot has a first nonlinear resistance layer partially overlapping with an end part of the low resistance corona shield layer and a second nonlinear resistance layer partially overlapping with an end part of the first nonlinear resistance layer, an electric resistivity of the second nonlinear resistance layer is set to a value larger than an electric resistivity of the first nonlinear resistance layer, and a lower limit value of the electric resistivity of the second nonlinear resistance layer in a predetermined electric field is larger than an upper limit value of the electric resistivity of the first nonlinear resistance layer by one order of magnitude or more, and a distance from the end part of the low resistance corona shield layer to the end part of the first nonlinear resistance layer is determined by the upper limit value and a lower limit value of the electric resistivity of the first nonlinear resistance layer and an upper limit value and the lower limit value of the electric resistivity of the second nonlinear resistance layer.

Advantageous Effects of Invention

Since the invention includes the first nonlinear resistance layer provided so as to partially overlap with the end part of the low resistance corona shield layer and the second nonlinear resistance layer provided so as to partially overlap with the end part of the first nonlinear resistance layer in a coil end of the rotary electric machine and the lower limit value of the electric resistivity of the second nonlinear resistance layer in a predetermined electric field strength is larger than the upper limit value of the electric resistivity of the first nonlinear resistance layer by one order of magnitude or more and a distance from the end part of the low resistance corona shield layer to the end part of the first nonlinear resistance layer is determined by the upper limit value and the lower limit value of the electric resistivity of the first nonlinear resistance layer and the upper limit value and the lower limit value of the electric resistivity of the second nonlinear resistance layer, even when the electric resistivity of the nonlinear resistance layer increases in a withstand voltage test, production variations in the electric field relaxation function caused by variations in the electric resistivity of the nonlinear resistance layer can be improved and a rotary electric machine having the stable electric field relaxation function can be obtained.

DESCRIPTION OF EMBODIMENTS

Embodiment 1

Figure 1:
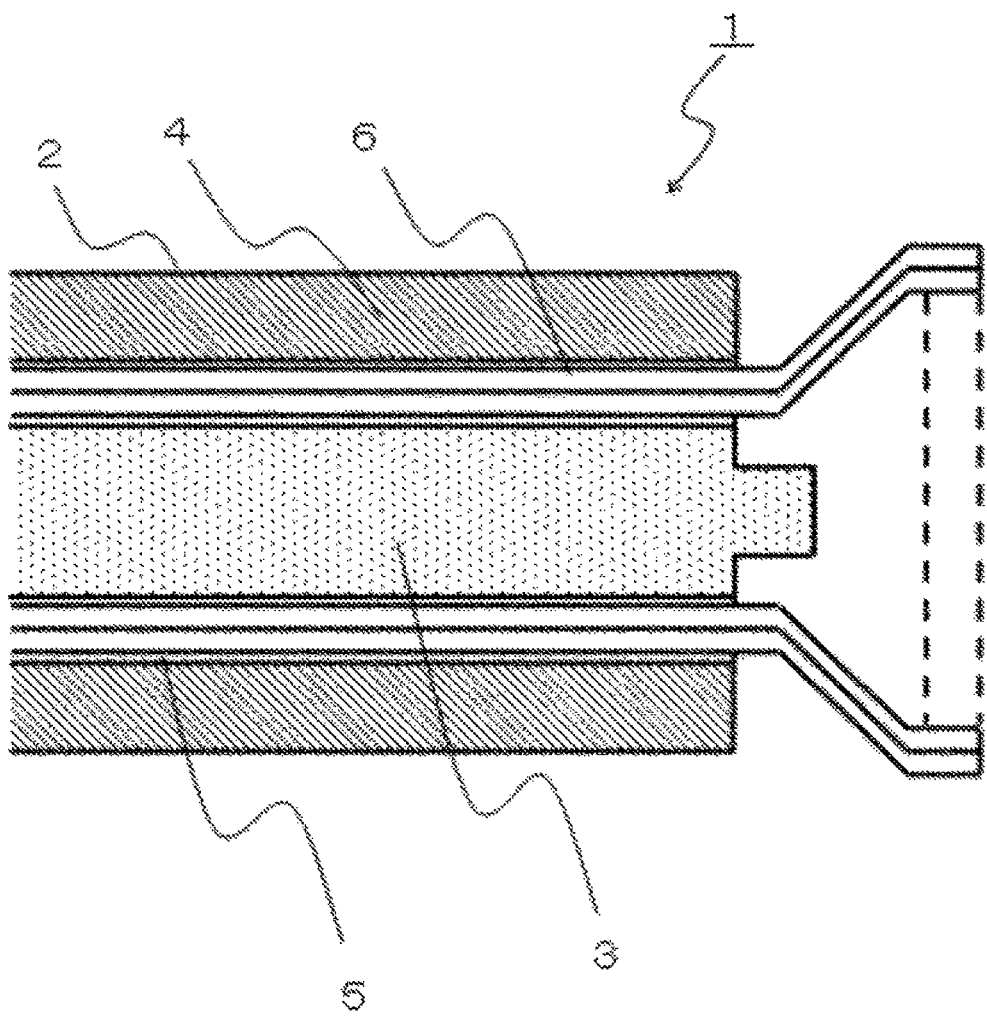
FIG. 1 is a schematic view illustrating a rotary electric machine according to embodiment 1 of the invention.

FIG. 1 is a schematic view illustrating a rotary electric machine according to embodiment 1 for practicing the invention. The rotary electric machine according to the embodiment is, for example, a turbine generator. In FIG. 1, a rotary electric machine 1 according to the embodiment includes a stator 2 and a rotor 3. The stator 2 includes a cylindrical stator iron core 4 that accommodates the rotor 3 at the center thereof and stator coils 6 partially accommodated in a slot 5 formed on the inner peripheral side of the stator iron core 4. The rotor 3 includes a cylindrical rotor iron core and a rotor coil (not illustrated).

The stator coils 6 are accommodated so as to be stacked in the circumferential direction of the slot 5 and the stator coils 6 accommodated on the inner peripheral side of the slot are connected to the stator coils 6 accommodated on the outer peripheral side of another slot 5 outside the stator 2.

Figure 2:
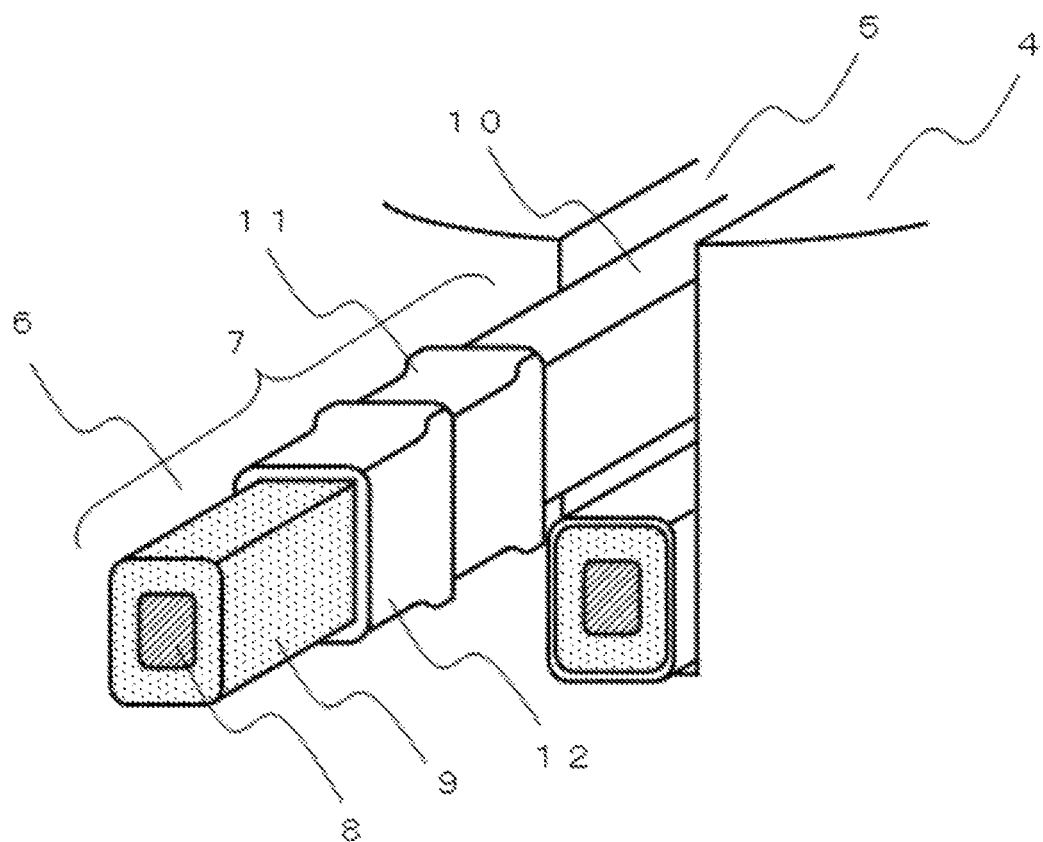
FIG. 2 is a schematic view illustrating a stator coil according to embodiment 1 of the invention.
Figure 3:
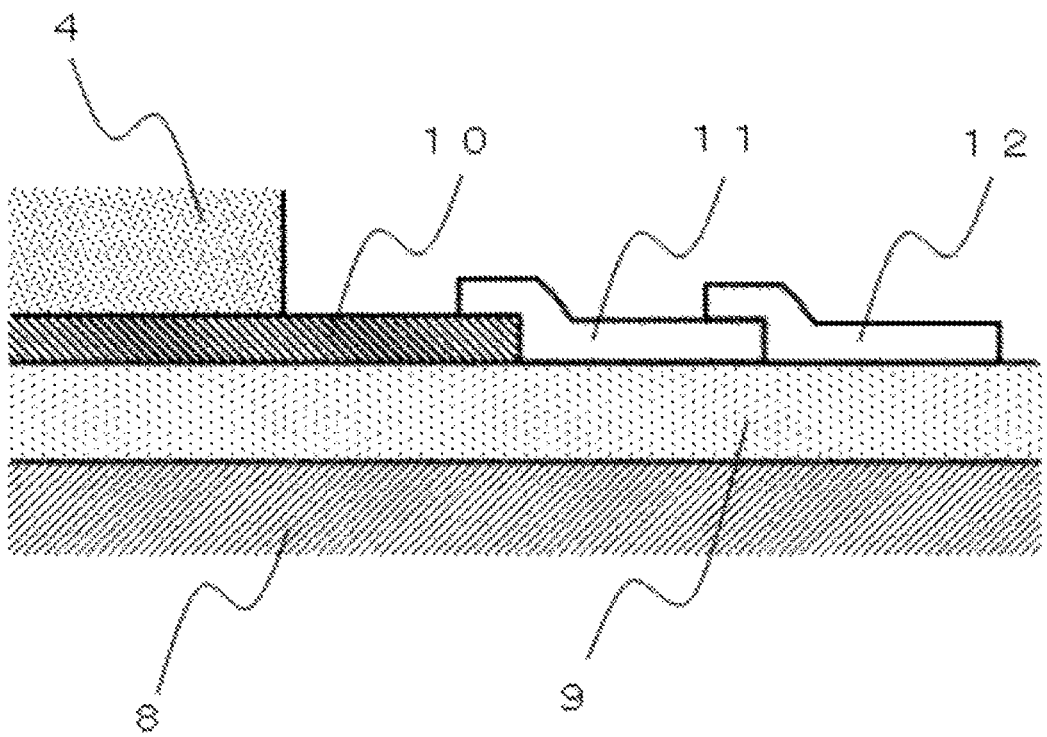
FIG. 3 is a schematic view illustrating the stator coil according to embodiment 1 of the invention.

FIG. 2 is a schematic view illustrating the stator coils 6 in the vicinity of an opening of the slot 5 in the end part of the stator iron core 4. In addition, FIG. 3 is a cross sectional view illustrating the stator coil in the vicinity of the opening of the slot 5. FIG. 3 illustrates only the outer surface of the stator coil 6.

The part of the stator coil 6 that extends outside the slot 5 is referred to as a coil end 7. As illustrated in FIG. 2, the basic structure of the stator coil 6 includes a coil conductor 8 having a bundle of copper elemental wires and a main insulation layer 9 formed around the coil conductor 8. In addition, the main insulation layer 9 is formed by winding mica tapes having very good corona-resistant discharge characteristics around the coil conductor, impregnating the mica tapes with heat-hardening resin such as epoxy resin, and curing the heat-hardening resin.

As illustrated in FIG. 3, in the part of the stator coil 6 that is accommodated in the slot 5 and the proximity part of the stator coil 6 that extends outside the slot, a low resistance corona shield layer 10 is provided around the main insulation layer 9. This low resistance corona shield layer 10 is electrically connected to the stator iron core 4. It should be noted here that the stator iron core 4 is set to the ground electric potential. The low resistance corona shield layer 10 to be set to the ground electric potential has the effect of suppressing partial discharge in the stator coil 6 in the slot 5.

In the stator coil 6 of the coil end 7, a first nonlinear resistance layer 11 is provided so as to partially overlap with the end part of the low resistance corona shield layer 10 provided across the proximity part outside the slot. In addition, a second nonlinear resistance layer 12 is provided so as to partially overlap with the end part of the first nonlinear resistance layer 11. The nonlinear resistance material constituting the first nonlinear resistance layer 11 and the second nonlinear resistance layer 12 has an electric resistivity that nonlinearly reduces as an electric field strength applied to the material increase. The nonlinear resistance material generally includes silicon carbide (SiC) particles mixed with insulating resin. The nonlinear resistance layer is formed by shaping such a material in a semi-hard state like tapes, winding the material around the surface of the main insulation layer, which is a basic structure of the stator coil, and thermally curing the material or by applying such a material in a paint-like state onto the surface of the main insulation layer and drying the material. In the embodiment, the electric resistivity of the second nonlinear resistance layer 12 is set to a value larger than the electric resistivity of the first nonlinear resistance layer 11. The relationship of these electric resistivities will be described in detail later.

Next, the effects of the nonlinear resistance layer will be described.

The surface potential of the coil end 7 of the stator coil 6 starts rising in the longitudinal direction of the coil from the end part of the low resistance corona shield layer 10, which is the ground electric potential, and becomes the same potential as the coil conductor 8 in a position sufficiently away from the end part of the low resistance corona shield layer 10. When the nonlinear resistance layer is not present, the creepage electric field strength along the coil surface suddenly increases in the vicinity of the end part of the low resistance corona shield layer 10 because of the structure and partial discharge is likely to occur there. The nonlinear resistance layer is provided to relax a sudden rise of an electric field along the coil surface and suppress the occurrence of creepage discharge.

In the embodiment, the first nonlinear resistance layer 11 and the second nonlinear resistance layer 12 are provided and the electric resistivity of the second nonlinear resistance layer 12 is set to a value larger than the electric resistivity of the first nonlinear resistance layer 11. The reason why the two nonlinear resistance layers having different electric resistivities are provided will be described.

In the case of the nonlinear resistance layers, current flows in the longitudinal direction of the coil of the nonlinear resistance layers in order to achieve the electric field relaxation function at the coil end 7. Joule heat is generated in the nonlinear resistance layers by the current and the resistance components of the nonlinear resistance layers.

Figure 4:
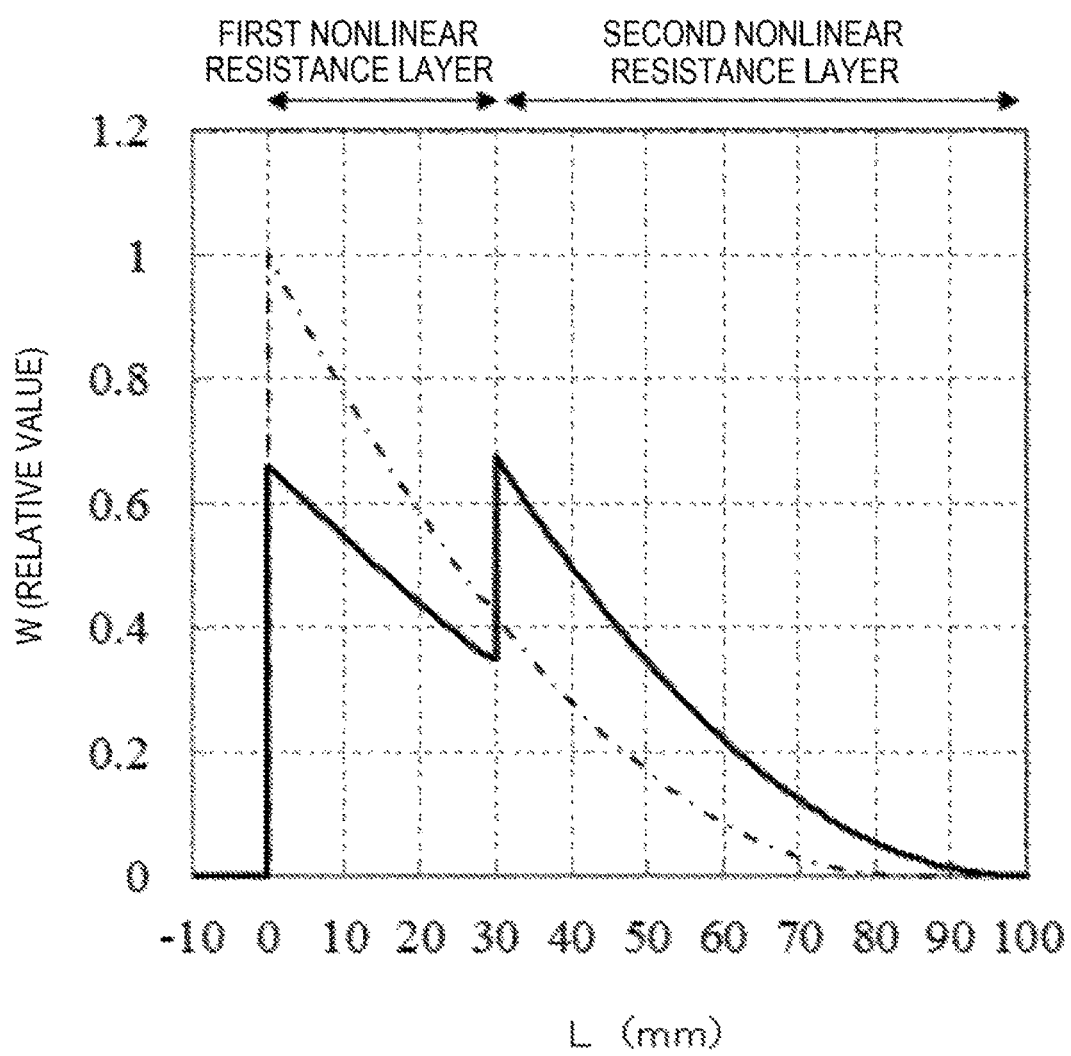
FIG. 4 is a characteristic diagram illustrating a coil end according to embodiment 1 of the invention.

FIG. 4 is a characteristic diagram illustrating the distribution of the heat generation density of the stator coil obtained by calculation at the coil end in the embodiment. In FIG. 4, the horizontal axis represents distance L (mm) from the end part of the low resistance corona shield layer 10 along the coil surface and the vertical axis represents heat generation density W (relative value) per unit time standardized on the basis of the maximum heat generation density when only the first nonlinear resistance layer is provided as the nonlinear resistance layer (also referred to below as a single-layer structure). In FIG. 4, the dashed line represents the distribution of the heat generation density of the single layer structure when only the first nonlinear resistance layer is provided and the solid line represents the distribution of the heat generation density when the first nonlinear resistance layer 11 and the second nonlinear resistance layer 12 are provided (also referred to below as a two-layer structure) as illustrated in FIG. 3. The calculation assumes that the first nonlinear resistance layer 11 extends 30 mm from the end part of the low resistance corona shield layer 10 and the second nonlinear resistance layer 12 extends 100 mm or more from the end part of the low resistance corona shield layer 10 while partially overlapping with the first nonlinear resistance layer 11. In addition, the electric resistivity of the second nonlinear resistance layer is set to a value larger than the electric resistivity of the first nonlinear resistance layer.

As illustrated in FIG. 4, when the nonlinear resistance layer is configured as one layer, the heat generation density has only one peak in the end part of the low resistance corona shield layer 10. In contrast, when the first nonlinear resistance layer 11 and the second nonlinear resistance layer 12 are provided, the electric resistivity of the second nonlinear resistance layer is set to a value larger than the electric resistivity of the first nonlinear resistance layer, and these electric resistivities are constant, the heat generation density has two peaks and the peak values are reduced to approximately 65%. Accordingly, by dividing the nonlinear resistance layer into two or more layers and setting the electric resistivity of the nonlinear resistance layer more distant from the low resistance corona shield layer 10 to a value larger than the electric resistivity of the nonlinear resistance layer closer to the low resistance corona shield layer 10, the heat generation density can be reduced. As a result, the local rise in the temperature of the nonlinear resistance layers can be suppressed.

Figure 5:
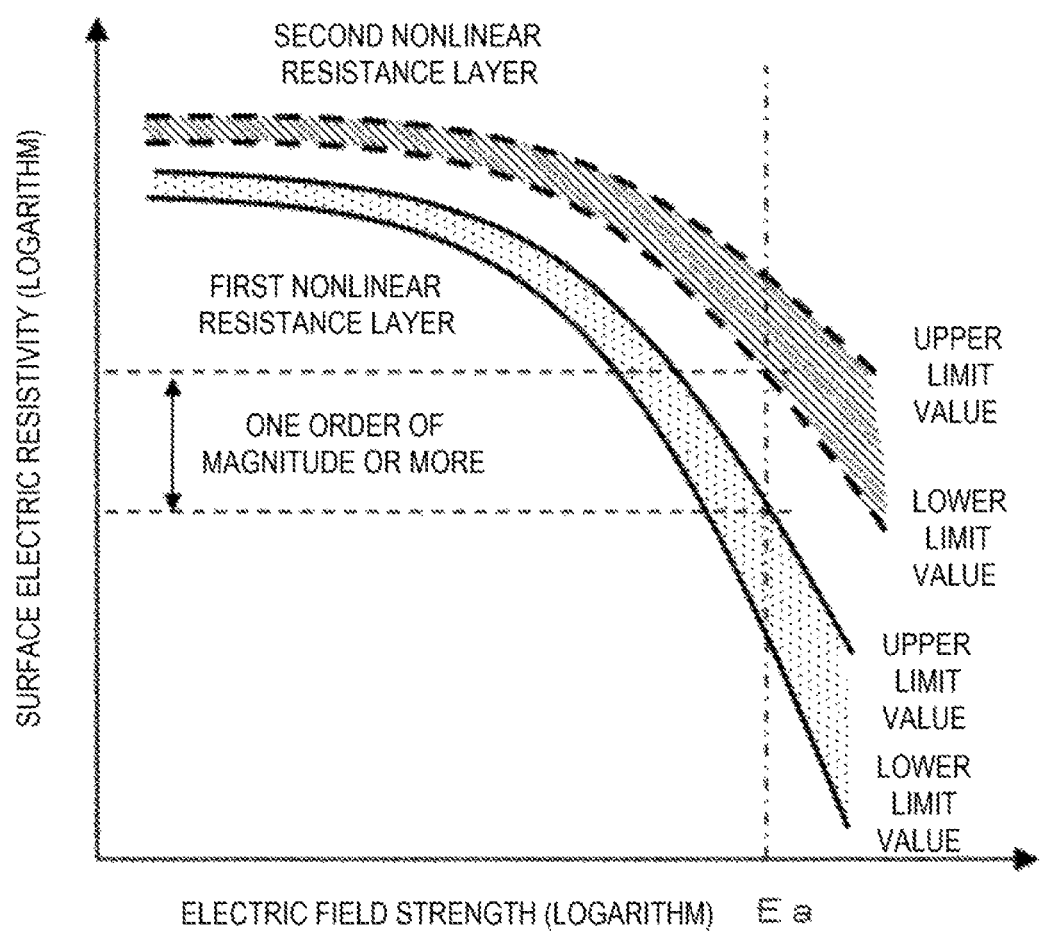
FIG. 5 is a characteristic diagram illustrating a nonlinear resistance material according to embodiment 1 of the invention.

FIG. 5 is a characteristic diagram illustrating the relationship between the electric field strength and the surface electric resistivity of the nonlinear resistance material used for the nonlinear resistance layer in the embodiment. As described above, the nonlinear resistance material generally includes silicon carbide (SiC) particles mixed with insulating resin. The characteristics (the relationship between the electric field strength and the electric resistivity) of the nonlinear resistance material configured in this way are known to have large variations. For example, the lower limit value and the upper limit value of the electric resistivity with respect to a predetermined electric field strength are empirically known to be different from each other by approximately one order of magnitude even for the same material (the mixing ratio between SiC and insulating resin is identical). In FIG. 5, the solid lines indicate the upper limit value and the lower limit value of the characteristics of the first nonlinear resistance layer and the dashed lines indicate the upper limit value and the lower limit value of the characteristics of the second nonlinear resistance layer. It is estimated that variations in the characteristics of the nonlinear resistance material are caused by variations in the diameter and particle shape of SiC particles and the nonuniformity of the distribution state of SiC particles in insulating resin.

As illustrated in FIG. 5, in the embodiment, the electric resistivity of the second nonlinear resistance layer is set to a value larger than the electric resistivity of the first nonlinear resistance layer and, in a predetermined electric field strength Ea, the lower limit value of the electric resistivity of the second nonlinear resistance layer is set to a value larger than the upper limit value of the electric resistivity of the first nonlinear resistance layer by one order of magnitude or more.

In such a structure, even when the electric resistivity of the nonlinear resistance layer increases in a withstand voltage test, production variations in the electric field relaxation function caused by variations in the electric resistivity of the nonlinear resistance layer can be improved and a rotary electric machine having the stable electric field relaxation function can be obtained.

The following describes that such working effects can be obtained.

In a withstand voltage test of a large rotary electric machine, the voltage obtained by doubling the rated voltage and adding 1 kV to the result is applied as the test voltage to a stator coil. The rated voltage of a turbine generator, which depends on the capacity of a heat generator, ranges from 15 kV to 30 kV (effective value). That is, the test voltage during a withstand voltage test ranges from 31 kV to 61 kV. In addition, the number of withstand voltage tests is not limited to one and may be two or more.

In the case of a normal rated voltage, the Joule heat generated in the nonlinear resistance layers of a two-layer structure is not so large. However, in a withstand voltage test for applying a high voltage equal to or more than twice as large as the rated voltage, the inventor et al. have clarified that Joule heat in the nonlinear resistance layers greatly changes the electric resistivities of the nonlinear resistance layers. In addition, the nonlinear resistance material has a higher resistance as the temperature rises and the change in the electric resistivity is irreversible. That is, the inventor et al. have found that, when the resistance of the nonlinear resistance material has become high once as the temperature rises, the high resistance state is kept after cooling. When the electric resistivity of the first nonlinear resistance layer increases and approaches the electric resistivity of the second nonlinear resistance layer, the characteristic for reducing the heat generation density in the two-layer structure indicated by the solid line in FIG. 4 cannot be obtained and the distribution of the heat generation density becomes similar to that of the single-layer structure indicated by the dashed line in FIG. 4. As a result, positive feedback is entered to further cause heat generation in the first nonlinear resistance layer and further increase the resistance, nonlinear resistance characteristics are lost finally, the electric field relaxation function cannot be achieved, and creepage discharge occurs.

To avoid degradation in the electric field relaxation function in a withstand voltage test as described above, it is important to quantitatively clarify the heat generation density generated in the nonlinear resistance layer and the level of increase in the electric resistivity caused consequently. The inventor compared the electric resistivity of the nonlinear resistance layer in an initial state before application of a voltage with the electric resistivity after generating Joule heat in the nonlinear resistance layer by applying a predetermined electric field to the coil conductor in a model coil that simulates the nonlinear resistance layer of the stator coil end. At this time, the heat generation density per unit time generated in the nonlinear resistance layer when the predetermined electric field is applied was calculated on the basis of transient electric field analysis. It should be noted here that predetermined electric field strength was 0.5 kV/rm. It was confirmed that this value fell within the range of the electric field strength applied to the nonlinear resistance layer during a withstand voltage test of a turbine generator.

The structure of the model coil used for the verification will be described below. A square iron block having a cross sectional area of 600 mm$^2$ and a length of 1000 mm was used as the coil conductor of the model coil. Mica tapes were wound around the square block, the mica tapes were impregnated with heat-hardening resin such as epoxy resin, and then the heat-hardening resin was cured to manufacture the model coil. The thickness of the main insulation layer after resin was cured was approximately 3 mm. Of the circumference of the main insulation layer, the low resistance corona shield layer was provided in the range having a width of 200 mm in the center part of the model coil, and a first nonlinear resistance layer was provided so as to partially overlap with both end parts of the low resistance corona shield layer. In addition, a second nonlinear resistance layer having a resistance larger than the first nonlinear resistance layer was provided so as to partially overlap with the end part of the first nonlinear resistance layer. The distance from the end part of the low resistance corona shield layer to the second nonlinear resistance layer was 30 mm.

Figure 6:
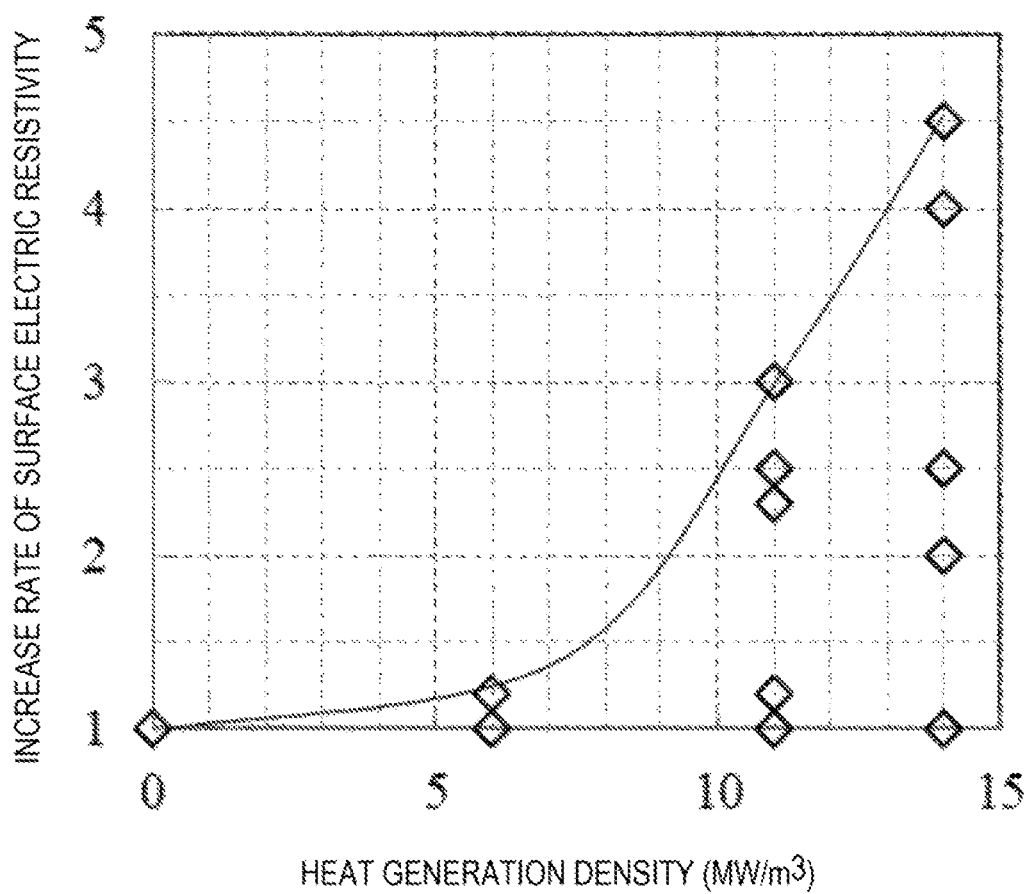
FIG. 6 is a characteristic diagram illustrating a model coil according to embodiment 1 of the invention.

FIG. 6 is a characteristic diagram illustrating the relationship between the heat generation density and the increase rate of the electric resistivity of the model coil described above. In FIG. 6, the horizontal axis represents the heat generation density obtained on the basis of transient electric field analysis and the vertical axis represents the change rate of the surface electric resistivity. The change rate in the vertical axis is a relative value with respect to the electric resistivity of the nonlinear resistance layer in an initial state in which a voltage is not applied yet.

It can be seen from FIG. 6 that, as the Joule heat generated in the nonlinear resistance layer is larger (that is, as the heat generation density is larger), the surface electric resistivity increases. The increase rate is up to five times. In addition, it can also be seen that the change ratio of the surface electric resistivity varies greatly as the heat generation density is larger. It was confirmed that the heat generation density represented in the horizontal axis was almost the same as the value that could be generated in the nonlinear resistance layer during a withstand voltage test of a turbine generator.

Figure 7:
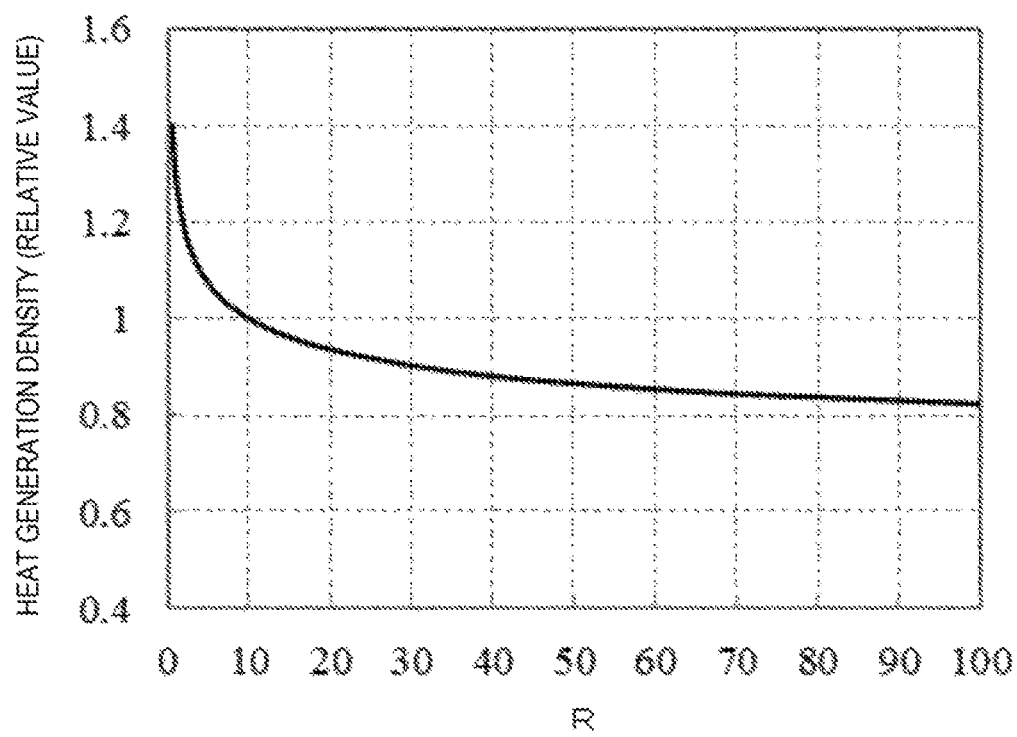
FIG. 7 is a characteristic diagram illustrating the nonlinear resistance material according to embodiment 1 of the invention.

FIG. 7 is a characteristic diagram illustrating the relationship between the ratio of the lower limit value of the electric resistivity of the second nonlinear resistance layer to the upper limit value of the electric resistivity of the first nonlinear resistance layer and the heat generation density calculated in consideration of increase in the electric resistivity of the nonlinear resistance characteristic by Joule heating. The characteristic values illustrated in FIG. 7 are obtained as described below.

First, the upper limit value of the electric resistivity of the first nonlinear resistance layer and the lower limit value of the electric resistivity of the second nonlinear resistance layer are set and the heat generation density per unit time generated in the first nonlinear resistance layer is calculated on the basis of transient electric field analysis. At this time, the electric resistivity of the first nonlinear resistance layer was increased by a factor of a predetermined value so as to correspond to the horizontal axis in FIG. 7 and the result was used as the electric resistivity of the second nonlinear resistance layer. Next, the increase rate of the electric resistivity of the first nonlinear resistance layer by Joule heat is obtained using the heat generation density generated in the first nonlinear resistance layer and the solid line connecting the upper limit data of the relationship between the heat generation density and the increase rate of the electric resistivity in FIG. 6. The electric resistivity of the first nonlinear resistance layer is changed (increased) according to the increase rate. The heat generation density generated in the first nonlinear resistance layer was calculated on the basis of transient electric field analysis again using the electric resistivity of the first nonlinear resistance layer for which the resistance has been increased and the electric resistivity of the second nonlinear resistance layer. FIG. 7 illustrates the results. In FIG. 7, the horizontal axis represents the ratio (R) of the lower limit value of the electric resistivity of the second nonlinear resistance layer to the upper limit value of the electric resistivity of the first nonlinear resistance layer and the vertical axis represents the heat generation density generated in the first nonlinear resistance layer. This vertical axis represents the value standardized on the basis of the heat generation density when the value in the horizontal axis is 10.

It can been seen from FIG. 7 that the heat generation density greatly increases when the ratio of the lower limit value of the electric resistivity of the second nonlinear resistance layer to the upper limit value of the electric resistivity of the first nonlinear resistance layer is less than 10. In addition, when the ratio of the lower limit value of the electric resistivity of the second nonlinear resistance layer to the upper limit value of the electric resistivity of the first nonlinear resistance layer is 10 or more, the heat generation density changes gently. As described above, the inventor et al. have found that the ratio of the lower limit value of the electric resistivity of the second nonlinear resistance layer to the upper limit value of the electric resistivity of the first nonlinear resistance layer is important to obtain the stable electric field relaxation function by reducing the heat generation density. Accordingly, by setting the lower limit value of the electric resistivity of the second nonlinear resistance layer to a value larger than the upper limit value of the electric resistivity of the first nonlinear resistance layer by one order of magnitude or more in a predetermined electric field strength, a rise in the temperature of the nonlinear resistance layer by Joule heat can be suppressed.

In such a structure, even when the electric resistivity of the nonlinear resistance layer increases in a withstand voltage test, production variations in the electric field relaxation function caused by variations in the electric resistivity of the nonlinear resistance layer can be improved and a rotary electric machine having the stable electric field relaxation function can be obtained.

Embodiment 2

Although the predetermined electric field strength applied to the nonlinear resistance layer is 0.5 kV/mm in embodiment 1, the creepage electric field strength actually generated on the nonlinear resistance layer of a turbine generator is not clear because the electric field strength is determined depending on the resistance characteristic of the nonlinear resistance material applied. In embodiment 2, the electric field strength that can be actually generated in a turbine generator is set on the basis of the upper limit value of the electric resistivity of the first nonlinear resistance layer and the lower limit value of the electric resistivity of the second nonlinear resistance layer.

Figure 8:
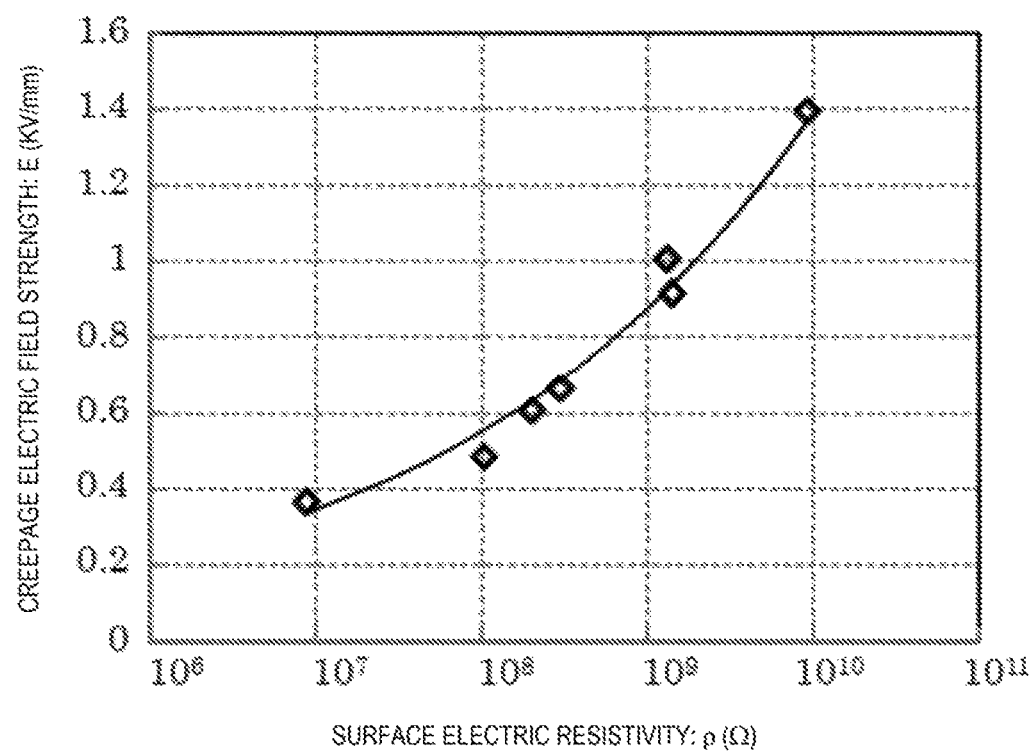
FIG. 8 is a characteristic diagram illustrating a nonlinear resistance material according to embodiment 2 of the invention.

FIG. 8 is a characteristic diagram illustrating the relationship between the electric resistivity of the nonlinear resistance layer according to the embodiment and the creepage electric field strength generated on the surface of the nonlinear resistance layer. In FIG. 8, the horizontal axis represents the electric resistivity of the nonlinear resistance layer and the vertical axis represents the creepage electric field strength generated on the surface of the nonlinear resistance layer. The measured points illustrated in FIG. 8 correspond to the actual electric resistivities measured in the nonlinear resistance layer at an electric field strength of 0.5 kV/rm. In addition, the creepage electric field strength is the creepage electric field strength calculated by transient electric field analysis when the frequency of the applied voltage is 60 Hz, the voltage value is 50 kVrms, and thickness of the main insulation layer is 3 mm.

On the basis of the results in FIG. 8, the relationship between the electric resistivity ($\rho$ $\Omega$) of the nonlinear resistance layer and the creepage electric field strength (E kV/mm) is approximated by expression (1) below.

[Math. 1]

$$E \times 0.01350 \times \rho^{0.2013} \quad (1)$$

When the lower limit value of the electric resistivity of the first nonlinear resistance layer at an electric field strength of 0.5 kV/mm is $\rho_1$ ($\Omega$) and the upper limit value of the electric resistivity of the second nonlinear resistance layer is $\rho_2$ ($\Omega$) in the nonlinear resistance layer actually used in a turbine generator, the range of the predetermined electric field strength Ea is represented by expression (2) below.

[Math. 2]

$$0.01350 \times \rho_1^{0.2013} < Ea < 0.1350 \times \rho_2^{0.2013} \quad (2)$$

Although the difference between the upper limit value of the surface electric resistivity of the first nonlinear resistance layer and the lower limit value of the surface electric resistivity of the second nonlinear resistance layer is increased by one order of magnitude or more in the predetermined electric field in embodiment 1, the predetermined electric field needs to be set to the electric field value generated in the coil end of the actual machine to achieve the effect obtained by increasing the difference by one order of magnitude or more in a withstand voltage test of an actual machine. By making the range of the predetermined electric field strength fall within the range of expression (2), it is possible to surely achieve the effect obtained by increasing the difference between the upper limit value of the surface electric resistivity of the first nonlinear resistance layer and the lower limit value of the surface electric resistivity of the second nonlinear resistance layer by one order of magnitude or more.

By setting the lower limit value of the electric resistivity of the second nonlinear resistance layer to a value larger than the upper limit value of the electric resistivity of the first nonlinear resistance layer by one order of magnitude or more within the range of the electric field strength Ea given by expression (2), even when the electric resistivity of the nonlinear resistance layer increases in a withstand voltage test, production variations in the electric field relaxation function caused by variations in the electric resistivity of the nonlinear resistance layer can be improved and a rotary electric machine having the stable electric field relaxation function can be obtained.

Embodiment 3

In embodiment 3, the distance from the end part of the low resistance corona shield layer to the end part of the first nonlinear resistance layer falls within a predetermined range that was determined depending on the characteristics of the first nonlinear resistance layer and the second nonlinear resistance layer in the rotary electric machine described in embodiment 1.

Figure 9:
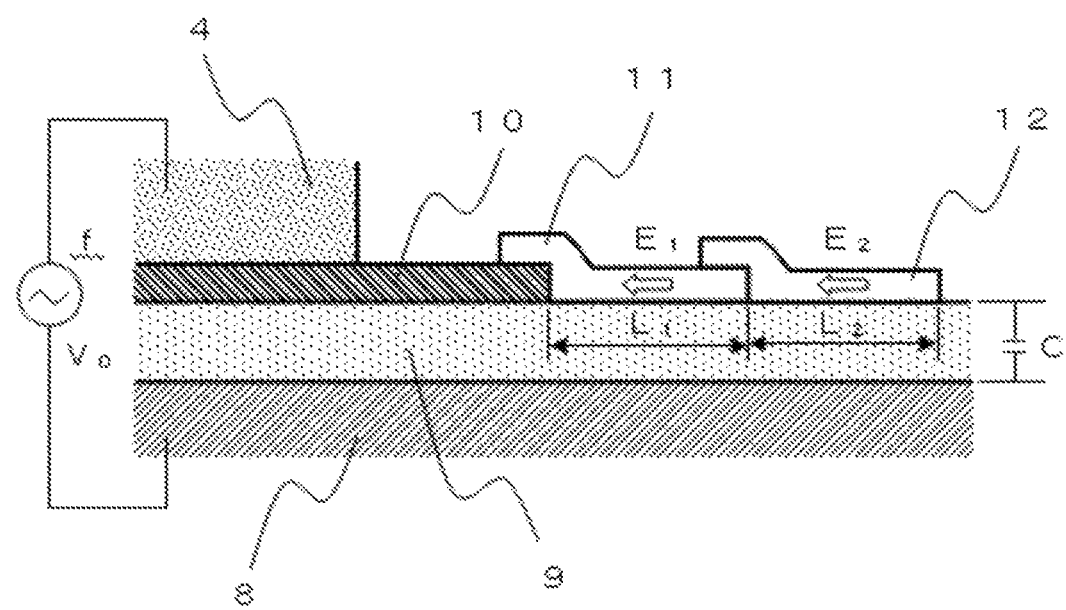
FIG. 9 is a schematic view illustrating a stator coil according to embodiment 3 of the invention.

FIG. 9 is a schematic view illustrating a coil end according to the embodiment. The basic structure is the same as in embodiment 1 in FIG. 3. It is assumed that the capacitance per unit area of the main insulation layer 9 is C and an AC voltage having a frequency of f and a maximum value of $V_0$ is applied across the stator core and the coil conductor 8. As illustrated in FIG. 9, it is assumed that the distance from an end part of a low resistance corona shield layer 4 to the end part of the first nonlinear resistance layer 11 is $L_1$ and the distance from the end part of the first nonlinear resistance layer 11 to the end part of the second nonlinear resistance layer 12 is $L_2$. Electric conduction is present between the fixed stator core and the low resistance corona shield layer 4 and these are set to the ground electric potential. At this time, it is assumed that the creepage electric field generated on the first nonlinear resistance layer 11 is $E_1$ and the creepage electric field generated on the second nonlinear resistance layer 12 is $E_2$.

It is assumed that the end part of the second nonlinear resistance layer 12 has the same electric potential as the coil conductor 8 (that is, the following expression holds) when the AC voltage reaches the maximum value.

[Math. 3]

$$V_0 \times E_1 L_1 + E_2 L_2 \quad (3)$$

As described above, the plurality of nonlinear resistance layers is applied in the longitudinal direction of the coil conductor to distribute the peak of the heat generation density of the nonlinear resistance layers due to Joule loss and reduce the maximum temperature. When two nonlinear resistance layers are provided, the ratio between the heat generation density at the border between the low resistance corona shield layer and the first nonlinear resistance layer and the heat generation density at the border between the first nonlinear resistance layer and the second nonlinear resistance layer mainly depends on the characteristic of each of the nonlinear resistance layers, the distance from the end part of the low resistance corona shield layer to the end part of the first nonlinear resistance layer, and the value of an applied voltage.

Ideally, the heat generation density can be minimized when the heat generation density at the border between the low resistance corona shield layer and the first nonlinear resistance layer is the same as the heat generation density at the border between the first nonlinear resistance layer and the second nonlinear resistance layer. However, since variations in the characteristics of nonlinear resistance materials are significantly great, when the heat generation densities at two positions are equalized for a particular combination of electric resistivities, the heat generation densities get out of balance inevitably if the electric resistivities vary, possibly causing local overheating. Accordingly, it is important to select the distance $L_1$ from the end part of the low resistance corona shield layer to the end part of the first nonlinear resistance layer so that the distance $L_1$ totally minimizes the heat generation density in consideration of variations of two electric resistivities.

There is a method for selecting the distance from the end part of the low resistance corona shield layer to the end part of the first nonlinear resistance layer by using the distance as a parameter and calculating the heat generation density for each combination of characteristics of nonlinear resistance layers on the basis of transient electric field analysis. On the other hand, derived were the following analytical expressions that obtain a heat generation density $W_1$ at the border between the low resistance corona shield layer and the first nonlinear resistance layer and a heat generation density $W_2$ at the border between the first nonlinear resistance layer and the second nonlinear resistance layer by theoretical consideration.

[Math. 4]

$$W_1 = 2fE_1 C \left[ L_1 \cdot (2V_0 - E_1 L_1) + \frac{(V_0 - E_1 L_1)^2}{E_2} \right] \quad (4)$$

[Math. 5]

$$W_2 = 2fE_2 C L_2 (V_0 - E_1 L_1) \quad (5)$$

Figure 10:
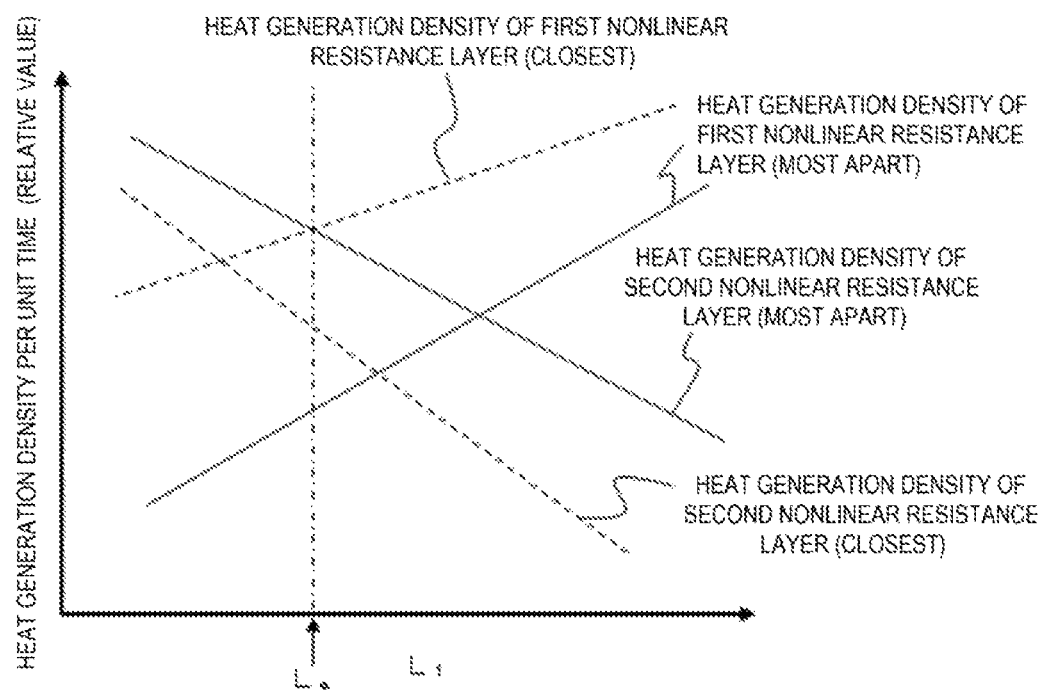
FIG. 10 is a characteristic diagram illustrating the stator coil according to embodiment 3 of the invention.

FIG. 10 is a characteristic diagram illustrating the relationship between the heat generation densities per unit time generated in the first nonlinear resistance layer and the second nonlinear resistance layer obtained by transient electric field analysis or the analytical expressions described above using the distance $L_1$ for the first nonlinear resistance layer as a parameter. In FIG. 10, the solid lines represent the trends of heat generation densities in the nonlinear resistance layers when the electric resistivity of the first nonlinear resistance layer is most apart from the electric resistivity of the second nonlinear resistance layer, that is, when the electric resistivity of the first nonlinear resistance layer takes the lower limit value and the electric resistivity of the second nonlinear resistance layer takes the upper limit value. On the other hand, in FIG. 10, the dashed lines represent the trends of the heat generation densities in the nonlinear resistance layers when the electric resistivity of the first nonlinear resistance layer is closest to the electric resistivity of the second nonlinear resistance layer, that is, when the electric resistivity of the first nonlinear resistance layer takes the upper limit value and the electric resistivity of the second nonlinear resistance layer takes the lower limit value.

It can be seen from FIG. 10 that the value $L_a$ corresponding to the intersection point between the line indicating the heat generation density of the first nonlinear resistance layer when the electric resistivity of the first nonlinear resistance layer takes the upper limit value and the electric resistivity of the second nonlinear resistance layer takes the lower limit value (that is, when these electric resistivities are closest to each other) and the line indicating the heat generation density of the second nonlinear resistance layer when the electric resistivity of the first nonlinear resistance layer takes the lower limit value and the electric resistivity of the second nonlinear resistance layer takes the upper limit value (that is, when these electric resistivities are most apart from each other) equals the distance from the end part of the low resistance corona shield layer to the end part of the first nonlinear resistance layer that can totally minimize the heat generation density in consideration of variations in the electric resistivities.

The distance from the end part of the low resistance corona shield layer to the end part of the first nonlinear resistance layer that can totally minimize the heat generation density in consideration of variations in the electric resistivities can be derived as described below. It is assumed that, when the electric resistivity of the first nonlinear resistance layer takes the upper limit value and the electric resistivity of the second nonlinear resistance layer takes the lower limit value (that is, when these electric resistivities are closest to each other), the creepage electric field generated on the first nonlinear resistance layer is $E_{1M}$ and the creepage electric field generated on the second nonlinear resistance layer is $E_{2M}$. At this time, the maximum heat generation density generated in the first nonlinear resistance layer is represented by the following expression.

[Math. 6]

$$W_1 = 2fE_{1M}C\left[L_1 \cdot (2V_0 - E_{1M}L_1) + \frac{(V_0 - E_{1M}L_1)^2}{E_{2m}}\right] \quad (6)$$

It is assumed that, when the electric resistivity of the first nonlinear resistance layer takes the lower limit value and the electric resistivity of the second nonlinear resistance layer takes the upper limit value (that is, when these electric resistivities are most apart from each other), the creepage electric field generated on the first nonlinear resistance layer is $E_{1M}$ and the creepage electric field generated on the second nonlinear resistance layer is $E_{2M}$. At this time, the maximum heat generation density generated in the second nonlinear resistance layer is represented by the following expression.

[Math. 7]

$$W_2 = 2fC(V_0 - E_{1m}L_1)^2 \quad (7)$$

$L_1$ that meets $W_1 = W_2$ is the distance from the end part of the low resistance corona shield layer to the end part of the first nonlinear resistance layer that can totally minimize the heat generation density in consideration of variations in electric resistivities. The following expression is derived as a quadratic equation of $L_1$ from expression (6) and expression (7) by assuming $W_1 = W_2$.

[Math. 8]

$$E_{1M}^3 - E_{1M}^2 E_{1m}^2 E_{2m})L_3^3 + (2V_0 E_{1M}E_{1m} - 2V_0 E_{1M}^3 + 2V_0 E_{1m}E_{2m})L_1 + (E_{1M} - E_{2m})V_0^2 = 0 \quad (8)$$

The following expression is obtained by solving the above expression with respect to $L_1$. Although the sign immediately before the square root can be positive mathematically, since $L_2$ becomes a negative value when $L_2$ in expression (3) is calculated using $L_1$ in this case, the sign immediately before the square root is inevitably negative.

[Math. 9]

$$L_1 = \frac{-(V_0 E_{1M}E_{2m} - V_0 E_{1M}^2 + V_0 E_{1m}E_{2m}) - \sqrt{(V_0 E_{1M}E_{2m} - V_0 E_{1M}^2 + V_0 E_{1m}E_{2m})^2 - (E_{1M}^3 - E_{1M}^2 E_{2m} - E_{1m}^2 E_{2m})(E_{1M} - E_{2m})V_0^2}}{E_{1M}^3 - E_{1M}^2 E_{2m} - E_{1m}^2 E_{2m}} \quad (9)$$

That is, the electric resistivity of the first nonlinear resistance layer and the electric resistivity of the second nonlinear resistance layer vary greatly. By setting the distance $L_1$ from the end part of the low resistance corona shield layer to the end part of the first nonlinear resistance layer to the position $L_a$ of the minimum value of the characteristic curve at which the heat generation density has the maximum value, even when the electric resistivity of the first nonlinear resistance layer and the electric resistivity of the second nonlinear resistance layer vary, the heat generation density does not rise any more.

As described in embodiment 1, the rated voltage of a turbine generator ranges from approximately 15 kV to 30 kV. Accordingly, the test voltage of a withstand voltage test is generally set to a value from 31 kV to 61 kV. In consideration of the electric resistivity of the nonlinear resistance layer that can be taken actually, the distance from the end part of the low resistance corona shield layer to the end part of the first nonlinear resistance layer is desirably 20 mm to 50 mm.

Embodiment 4

In the nonlinear resistance material applied to a rotary electric machine according to embodiment 4, the relationship between the average particle diameter of silicon carbide particles included in the first nonlinear resistance layer and the average particle diameter of silicon carbide particles included in the second nonlinear resistance layer was defined.

Figure 11:
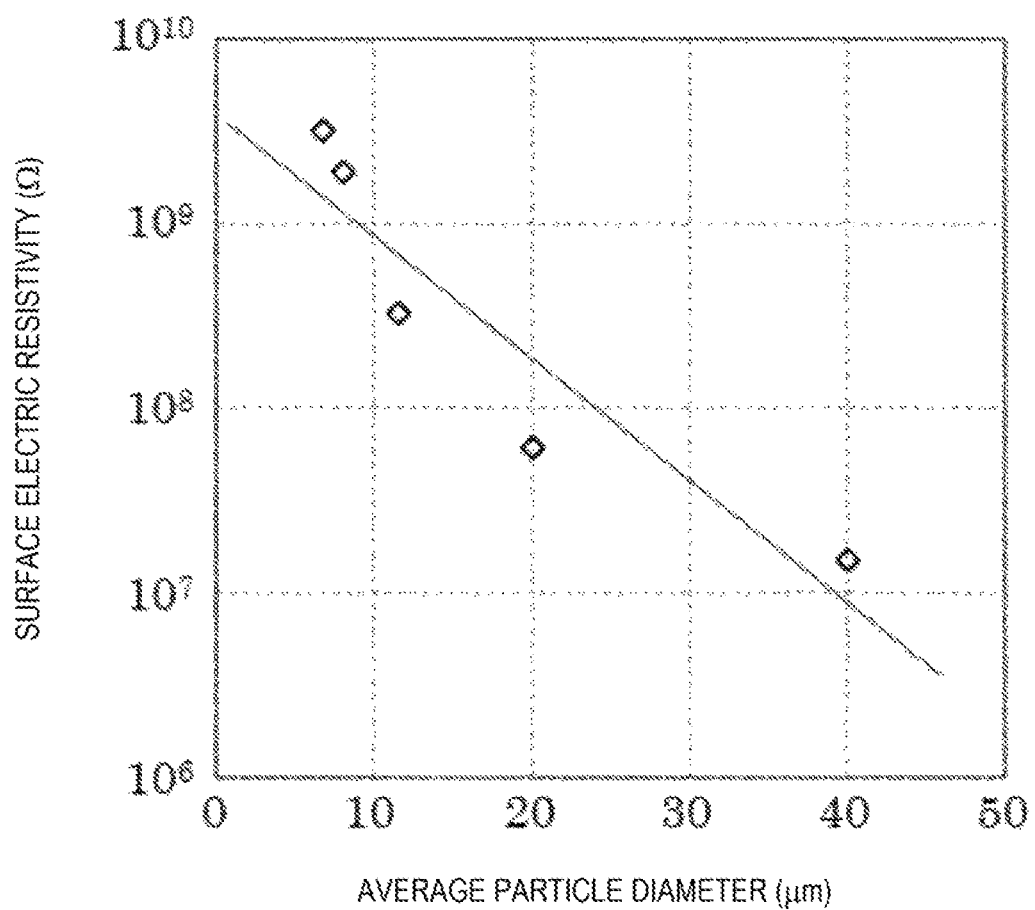
FIG. 11 is a characteristic diagram illustrating a nonlinear resistance material according to embodiment 4 of the invention.

FIG. 11 is a characteristic diagram illustrating the correlation between the average particle diameter of silicon carbide particles included in the nonlinear resistance material of the nonlinear resistance layer and the surface electric resistivity of the nonlinear resistance layer at an electric field strength of 0.5 kV/mm. The volume mixing ratio between silicon carbide particles and insulating resin was 40% and the average particle diameter of silicon carbide particles was changed to 40 μm at the maximum. It can be seen from FIG. 11 that the surface electric resistivity of the nonlinear resistance layer is reduced by one order of magnitude when the average particle diameter of silicon carbide particles is doubled.

Accordingly, when the average particle diameter of silicon carbide particles included in the first nonlinear resistance layer is set to a value equal to or more than twice as large as the average particle diameter of silicon carbide particles included in the second nonlinear resistance layer, it is possible to make the upper limit value of the electric resistivity of the first nonlinear resistance layer apart from the lower limit value of the electric resistivity of the second nonlinear resistance layer by one order of magnitude or more.

In such a structure, even when the electric resistivity of the nonlinear resistance layer increases in a withstand voltage test, production variations in the electric field relaxation function caused by variations in the electric resistivity of the nonlinear resistance layer can be improved and a rotary electric machine having the stable electric field relaxation function can be obtained.

Embodiment 5

In the nonlinear resistance material applied to a rotary electric machine according to embodiment 5, the average particle diameter of silicon carbide particles included in the first nonlinear resistance layer is similar to the average particle diameter of silicon carbide particles included in the second nonlinear resistance layer and the relationship between the volume mixing ratios of conductive particles added to the individual nonlinear resistance layers was defined.

Figure 12:
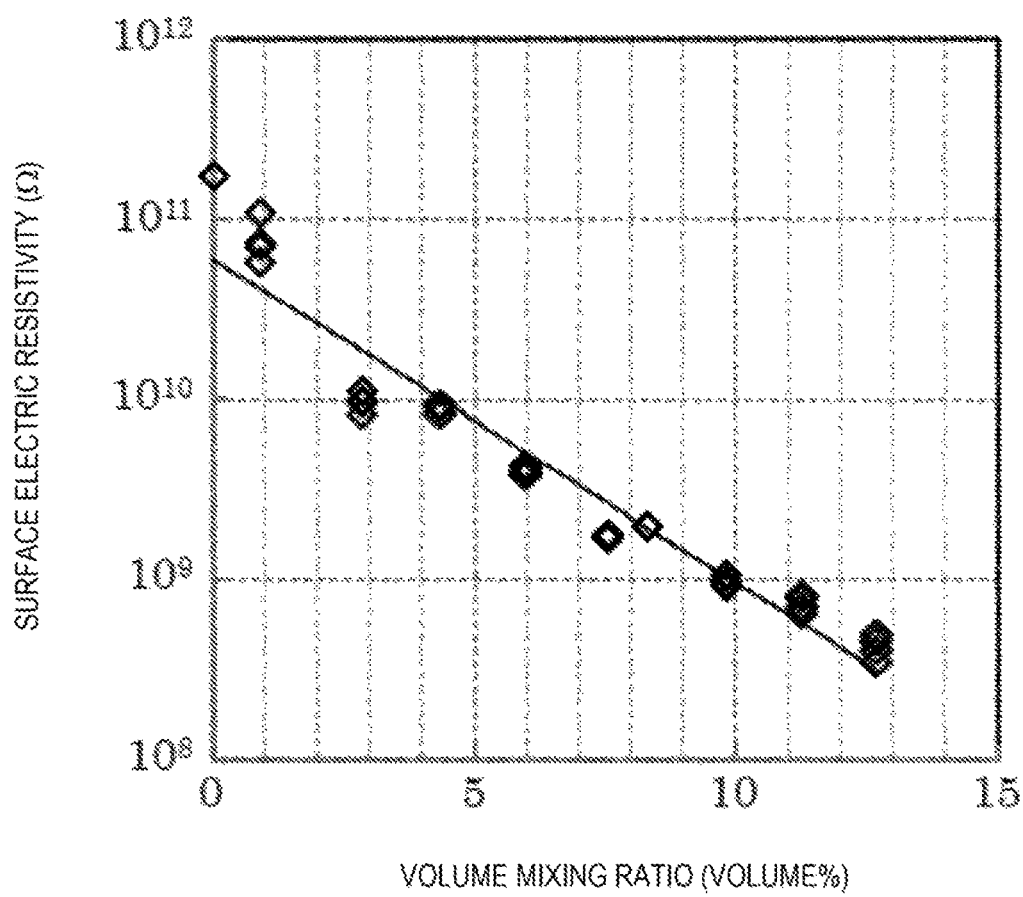
FIG. 12 is a characteristic diagram illustrating a nonlinear resistance material according to embodiment 5 of the invention.

FIG. 12 is a characteristic diagram illustrating the correlation between the volume mixing ratio of conductive particles included in the nonlinear resistance material of the nonlinear resistance layer and the surface electric resistivity of the nonlinear resistance layer at an electric field strength of 0.5 kV/mm. In the embodiment, triiron tetroxide particles are used as conductive particles. Here, the volume mixing ratio of silicon carbide particles is 40% and the average particle diameter is 10 μm. In addition, the average particle diameter of triiron tetroxide as conductive particle was 500 nm. It can be seen from FIG. 12 that, when the difference of the volume mixing ratios of conductive particles becomes 5.5 volume percent or more, the surface electric resistivity of the nonlinear resistance layer is reduced by one order of magnitude.

Accordingly, when the difference between the volume mixing ratio of conductive particles included in the first nonlinear resistance layer and the volume mixing ratio of conductive particles included in the second nonlinear resistance layer is 5.5 volume percent or more, the upper limit value of the electric resistivity of the first nonlinear resistance layer can be apart from the lower limit value of the electric resistivity of the second nonlinear resistance layer by one order of magnitude or more.

In such a structure, even when the electric resistivity of the nonlinear resistance layer increases in a withstand voltage test, production variations in the electric field relaxation function caused by variations in the electric resistivity of the nonlinear resistance layer can be improved and a rotary electric machine having the stable electric field relaxation function can be obtained.

REFERENCE SIGNS LIST

1: rotary electric machine
2: stator
3: rotor
4: stator iron core
5: slot
6: stator coil
7: coil end
8: coil conductor
9: main insulation layer
10: low resistance corona shield layer
11: first nonlinear resistance layer
12: second nonlinear resistance layer

The invention claimed is:

1. A rotary electric machine comprising:
a stator iron core having a slot;
a rotor rotatable with respect to the stator iron core; and
a stator coil having a part accommodated in the slot and an end part extending outside the slot,
wherein the stator coil includes a coil conductor and a main insulation layer provided on an outer peripheral part of the coil conductor,
the part of the stator coil accommodated in the slot has a low resistance corona shield layer provided on an outer peripheral part of the main insulation layer,
the part of the stator coil extending outside the slot has a first nonlinear resistance layer partially overlapping with an end part of the low resistance corona shield layer and a second nonlinear resistance layer partially overlapping with an end part of the first nonlinear resistance layer,
an electric resistivity of the second nonlinear resistance layer is set to a value larger than an electric resistivity of the first nonlinear resistance layer, and
a lower limit value of the electric resistivity of the second nonlinear resistance layer in a predetermined electric field is larger than an upper limit value of the electric resistivity of the first nonlinear resistance layer by one order of magnitude or more, and a distance from the end part of the low resistance corona shield layer to the end part of the first nonlinear resistance layer is determined by the upper limit value and a lower limit value of the electric resistivity of the first nonlinear resistance layer and an upper limit value and the lower limit value of the electric resistivity of the second nonlinear resistance layer.

2. The rotary electric machine according to claim wherein a distance L from the end part of the low resistance corona shield layer to the end part of the first nonlinear resistance layer is represented by the following expression:

$$L = \frac{-(V_0 E_{1M} E_{2m} - V_0 E_{1M}^2 + V_0 E_{1m} E_{2m}) - \sqrt{(V_0 E_{1M} E_{2m} - V_0 E_{1M}^2 + V_0 E_{1m} E_{2m})^2 - (E_{1M}^3 - E_{1M}^2 E_{2m} - E_{1m}^2 E_{2m})(E_{1M} - E_{2m})V_0^2}}{E_{1M}^3 - E_{1M}^2 E_{2m} - E_{1m}^2 E_{2m}}$$ [Math. 1]

when a creepage electric field generated on the first nonlinear resistance layer is assumed to be $E_{1M}$ and a creepage electric field generated on the second nonlinear resistance layer is assumed to be $E_{2m}$ in a case in which the electric resistivity of the first nonlinear resistance layer takes the upper limit value and the electric resistivity of the second nonlinear resistance layer takes the lower limit value, a creepage electric field generated on the first nonlinear resistance layer is assumed to be $E_{1m}$ and a creepage electric field generated on the second nonlinear resistance layer is assumed to be $E_{2M}$ in a case in which the electric resistivity of the first nonlinear resistance layer takes the lower limit value and the electric resistivity of the second nonlinear resistance layer takes the upper limit value, and a maximum value of a voltage applied to the stator coil is assumed to be $V_0$.

3. The rotary electric machine according to claim 2, wherein the distance from the end part of the low resistance corona shield layer to the end part of the first nonlinear resistance layer is at least 20 mm but no more than 50 mm.

4. The rotary electric machine according to claim 2, wherein the first nonlinear resistance layer and the second nonlinear resistance layer include silicon carbide particles as a nonlinear resistance material and an average particle diameter of the silicon carbide particles included in the first nonlinear resistance layer is equal to or more than twice as large as an average particle diameter of the silicon carbide particles included in the second nonlinear resistance layer.

5. The rotary electric machine according to claim 2, wherein the first nonlinear resistance layer and the second nonlinear resistance layer further include conductive particles as a nonlinear resistance material and a volume mixing ratio of the conductive particles included in the first nonlinear resistance layer to the nonlinear resistance material is larger than a volume mixing ratio of the conductive particles included in the second nonlinear resistance layer to the nonlinear resistance material by 5.5 volume percent or more.

6. The rotary electric machine according to claim 1,
wherein the distance from the end part of the low resistance corona shield layer to the end part of the first nonlinear resistance layer is at least 20 mm but no more than 50 mm.

7. The rotary electric machine according to claim 6,
wherein the first nonlinear resistance layer and the second nonlinear resistance layer include silicon carbide particles as a nonlinear resistance material and
an average particle diameter of the silicon carbide particles included in the first nonlinear resistance layer is equal to or more than twice as large as an average particle diameter of the silicon carbide particles included in the second nonlinear resistance layer.

8. The rotary electric machine according to claim 3,
wherein the first nonlinear resistance layer and the second nonlinear resistance layer further include conductive particles as a nonlinear resistance material and
a volume mixing ratio of the conductive particles included in the first nonlinear resistance layer to the nonlinear resistance material is larger than a volume mixing ratio of the conductive particles included in the second nonlinear resistance layer to the nonlinear resistance material by 5.5 volume percent or more.

9. The rotary electric machine according to claim 1,
wherein the first nonlinear resistance layer and the second nonlinear resistance layer include silicon carbide particles as a nonlinear resistance material and
an average particle diameter of the silicon carbide particles included in the first nonlinear resistance layer is equal to or more than twice as large as an average particle diameter of the silicon carbide particles included in the second nonlinear resistance layer.

10. The rotary electric machine according to claim 9,
wherein the first nonlinear resistance layer and the second nonlinear resistance layer further include conductive particles as the nonlinear resistance material and
a volume mixing ratio of the conductive particles included in the first nonlinear resistance layer to the nonlinear resistance material is larger than a volume mixing ratio of the conductive particles included in the second nonlinear resistance layer to the nonlinear resistance material by 5.5 volume percent or more.

11. The rotary electric machine according to claim 1,
wherein the first nonlinear resistance layer and the second nonlinear resistance layer further include conductive particles as the nonlinear resistance material and
a volume mixing ratio of the conductive particles included in the first nonlinear resistance layer to the nonlinear resistance material is larger than a volume mixing ratio of the conductive particles included in the second nonlinear resistance layer to the nonlinear resistance material by 5.5 volume percent or more.

* * * * *